United States Patent
Huang et al.

(10) Patent No.: US 6,292,829 B1
(45) Date of Patent: Sep. 18, 2001

(54) METHOD AND DEVICE FOR NETWORK MANAGEMENT

(75) Inventors: Rick Huang, Nepean; Barry Williams, Stittsville, both of (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/115,610

(22) Filed: Jul. 15, 1998

(51) Int. Cl.[7] .................................................. G06F 15/173
(52) U.S. Cl. ............................................. 709/223; 707/100
(58) Field of Search ................................... 709/223, 224; 707/103, 104, 100, 9, 10, 3, 101, 102

(56) References Cited

U.S. PATENT DOCUMENTS

| | | | | |
|---|---|---|---|---|
| 5,291,583 | * | 3/1994 | Bapat | 707/103 |
| 5,317,742 | | 5/1994 | Bapat | 395/700 |
| 5,481,703 | * | 1/1996 | Kato | 707/101 |
| 5,581,478 | | 12/1996 | Cruse et al. | 364/505 |
| 5,651,006 | | 7/1997 | Fujino et al. | 370/408 |
| 5,799,153 | * | 8/1998 | Blau et al. | 709/223 |
| 5,832,498 | * | 11/1998 | Exertier | 707/103 |
| 5,848,243 | * | 12/1998 | Kulkarni et al. | 709/224 |
| 5,960,176 | * | 9/1999 | Kuroki et al. | 709/223 |
| 6,061,724 | * | 5/2000 | Ries et al. | 709/224 |
| 6,085,191 | * | 7/2000 | Fisher et al. | 707/9 |
| 6,101,538 | * | 8/2000 | Brown | 709/223 |
| 6,119,126 | * | 9/2000 | Yee et al. | 707/103 |

OTHER PUBLICATIONS

Langer, M., "Entwurf und Implimentierung eines CMIP/SNMP Gateways" Diplomarbeit, Institut für Informatik der Technischen Universität München, Nov. 1996.
English language translation of the summary of (1).

* cited by examiner

*Primary Examiner*—Mehmet B. Geckil

(57) ABSTRACT

A network management device supporting two network management protocols is disclosed. A suitable object oriented management information base ("MIB") is also disclosed. The device includes a simple network management protocol handler and stack for receiving SNMP PDUs and using these to operate on the MIB. Additionally, the device may include an additional common management information protocol ("CMIP") stack and is able to use CMIP PDUs to operate on the MIB.

21 Claims, 7 Drawing Sheets

METHOD AND DEVICE FOR NETWORK MANAGEMENT

FIELD OF THE INVENTION

The present invention relates to networked computing devices and more particularly to a method of network management and a network management device including a database suitable for use with two network management protocols.

BACKGROUND OF THE INVENTION

Network interconnected computing devices often allow for the remote management of the devices across the network. Physically distant devices can thus monitor and provision the operation of other devices.

Typically, management information is stored at one or more management devices interconnected with the network. The management information is stored within persistent computer memory in a database known as a management information base ("MIB"). Interconnected devices use known protocols to allow remote management of the network, typically by accessing the MIB of a management device. The MIB may store information about the names, status, and availability of network resources. Similarly, alteration of the MIB will cause the management device to change the availability and operation of existing network resources.

Many network devices, for example, support open management interfaces defined by the Simple Network Management Protocol, ("SNMP") as detailed in RFCs 1155, 1157, 1212, 1213, 1595, 1406, 1407 1450, 1573, 1595, 1695 and 2328, the contents of which are hereby incorporated by reference. Others support a newer network management protocol as defined in the Common Management Information Protocol ("CMIP"), detailed in the International Telecommunication Union ("ITU") Recommendations X.710, X.711, X.712, X.720, X.721, X.722, X.723, X.724, X.725, X.730, X.731, X.732, X.733, X.735, X.736, X.737, X.738, X.739, X.740, X.741, I.751, M.3100, and X.744, the contents of which are hereby incorporated by reference.

Devices that support the SNMP communicate using messages known as SNMP Protocol Data Units ("PDU"s), exchanged over the network. An SNMP protocol stack is used to encode and decode each SNMP PDU. After processing a request PDU, a response is encoded using the same stack to form a response PDU that is sent over the network. Devices that support the CMIP similarly communicate using CMIP PDUs. A CMIP stack is used to encode and decode CMIP PDUs. Decoded CMIP and SNMP PDUs each contain operations and associated parameters.

The extent to which the CMIP and SNMP are supported by a particular management device is typically contained in user documentation accompanying the device. Remote users can thus access the MIB of an existing device using documented CMIP or SNMP PDUs.

Architecturally, the SNMP is quite dissimilar from the CMIP. The former is an internet based protocol, and thus typically relies on an internet protocol ("IP") suite, and IP (either TCP/IP or UDP/IP) packets. The latter is hierarchical, object oriented, adheres to an open systems interconnection management standard, and does not rely on IP packets.

SNMP operations are best suited to operate on management data stored in a two dimensional relational database, as for example, detailed in RFC 1213. Thus, SNMP is utilized in association with a two dimensional relational MIB. CMIP, on the other hand, is an object oriented protocol and thus is best suited to operate on an object oriented MIB. Although structured differently, both relational and object oriented MIBs contain similar network management information. In view of the different design approaches of SNMP and CMIP and the differences in associated MIB structures, decoded SNMP and CMIP PDUs contain different operations and parameters relating to the associated MIBs.

As SNMP and, more recently, CMIP have become widely accepted, some devices support both protocols. Most of these devices incorporate both a CMIP and SNMP stack Several solutions enabling support of both CMIP and SNMP are known.

Some devices map information in a CMIP suitable, object oriented MIB to a relational MIB. As will be appreciated, mapping an object oriented MIB to a relational MIB is typically difficult.

Other devices use an SNMP to CMIP gateway, as suggested in Longer, M. "Entwurf und Implimentierung eines CMIP/SNMP Gateways", Diplomarbeit, Institut für Informatik der Technischen Universität München, November 1996. Using such a gateway, an SNMP stack receives an SNMP PDU; decodes it; passes it to the gateway that converts the SNMP operation and parameters into an equivalent CMIP PDU; and passes the CMIP PDU to a CMIP stack for processing. The resulting CMIP response is passed through the CMIP stack to form a response CMIP PDU that is passed through the gateway to produces an SNMP compliant response that is then passed to the SNMP stack. As will be appreciated, this takes time, as each SNMP PDU must pass through two stacks and a gateway.

Yet other devices maintain two separate MIBs. One is relational, suited for use with SNMP management operations, while the other is object oriented, and suited for use with CMIP management operations. Maintaining two databases, however, requires extra storage capacity and is computationally complex as both MIBs must remain synchronized.

Accordingly, the present invention offers a further method and interface allowing support of the two distinct network management protocols.

SUMMARY OF THE INVENTION

It is an object of the present invention, to provide a network management device that allows network management using two network protocols and a single MIB.

Advantageously, this MIB is object oriented.

In accordance with an aspect of the present invention there is provided an object oriented management information base, for implementation by a computing device in an object oriented framework comprising: a) a root object comprising: i) attributes identifying a managed object class used to at least partially define the information base and possibly containing information corresponding to information contained in a relational database; ii) functions to access the attributes; and b) a plurality of managed objects, each the managed object defined by a managed object class, each of the managed objects comprising: i) management information attributes; ii) a mapping schema, mapping the management information attributes to attributes of the relational database.

In accordance with another aspect of the present invention there is provided a method of applying an SNMP network management operation to an object oriented management information base, comprising a root object and a plurality of managed objects. The method comprises the steps of: a) decoding the SNMP network management operation to obtain first, second and third parameters; b) using the first parameter to query the root object of the object oriented management information base to identify a class of corresponding managed object; c) using the second parameter to identify an instance of the identified class of managed object; d) using the third parameter to identify an attribute of the instance; e) translating the SNMP operation to an object oriented operation; and f) applying the object oriented operation to the identified instance and attribute of the class.

In accordance with a further aspect of the present invention there is provided a network management device, for communication with a digital computer network. The network management device comprises: a processor; memory in communication with the processor; the memory containing a) an object oriented management information base comprises: I. a root object comprising: (i) attributes identifying a managed object class used to at least partially define the information base and possibly containing information corresponding to information contained in a relational database; (ii) functions to access the attributes; II. a plurality of managed objects, each the of the managed objects comprising: (i) management information attributes; (ii) a mapping schema, mapping the management information attributes to attributes of the relational database b) an SNMP stack for receiving SNMP PDUs from the network interface; c) an SNMP interface for operating on the object oriented management information base, as required by the SNMP PDUs.

In accordance with yet a further aspect of the present invention there is provided a network management device comprising: a) an object oriented management information base storing management information; b) means for receiving SNMP PDUs; c) means for receiving CMIP PDUs; d) means for operating on the object oriented management information in response to the received SNMP PDUs; e) means for operating on the object oriented management information in response to the received CMIP PDUs.

In accordance with another aspect of the present invention there is provided a computer readable medium storing computer software and data that when loaded by a computing device defines an object oriented management information base, for implementation by the computing device in an object oriented framework comprising: a) a root object comprising: (i) attributes identifying a managed object class used to at least partially define the information base and possibly containing information corresponding to information contained in a relational database; (ii) functions to access the attributes; and b) a plurality of managed objects, each the managed object defined by a managed object class, each of the managed objects comprising: (i) management information attributes; (ii) a mapping schema, mapping the management information attributes to attributes of the relational database.

In accordance with another aspect of the present invention there is provided a method of dispatching an SNMP trap from a computer having an object oriented management information base, the method comprising the steps of: a) intercepting an object oriented compliant event report; b) translating the object oriented compliant event report into an SNMP compliant trap; c) dispatching the SNMP compliant trap.

BRIEF DESCRIPTION OF THE DRAWING

In figures which illustrate preferred embodiments of the invention.

DETAILED DESCRIPTION

Figure 1:
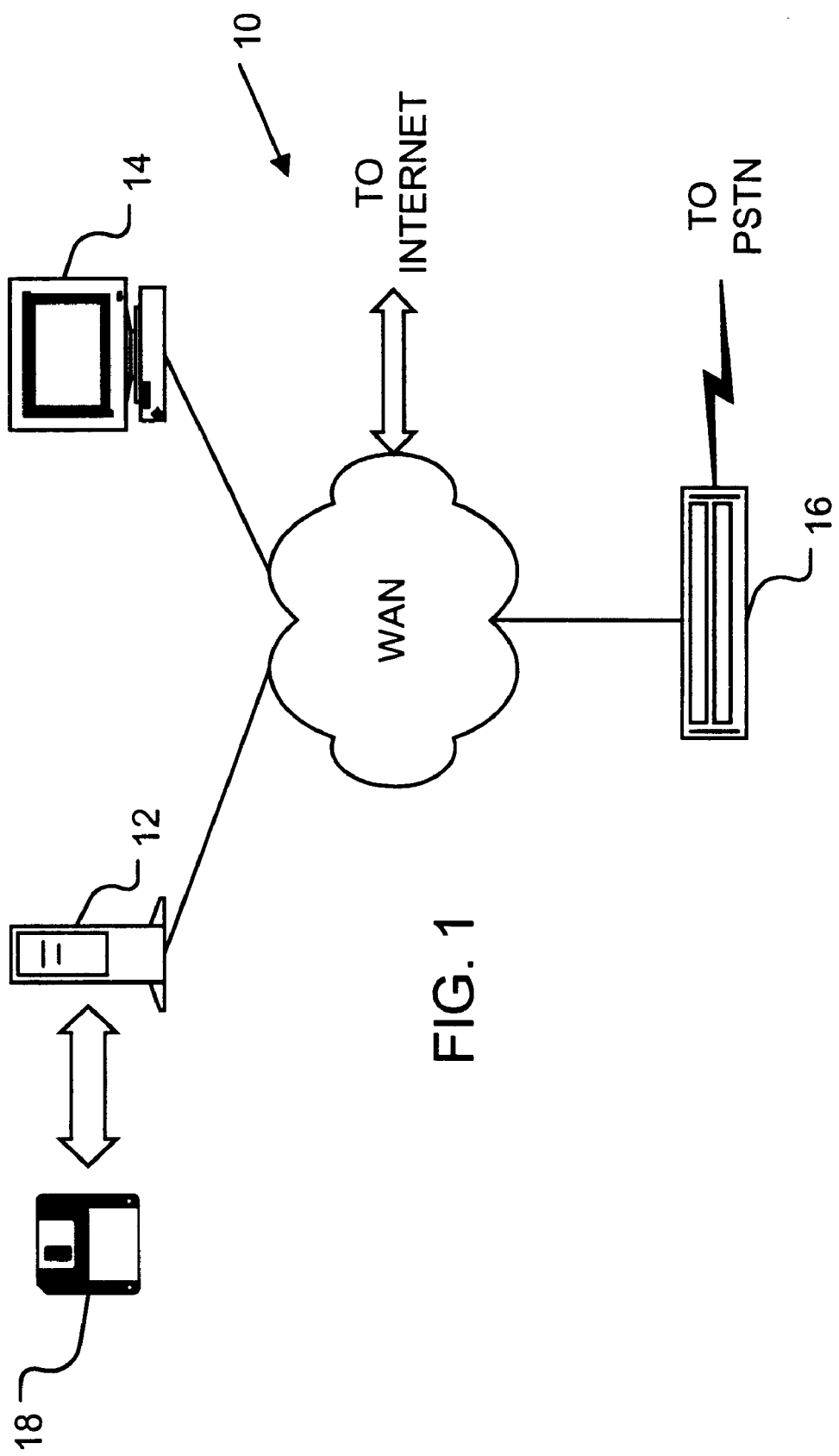
FIG. 1 illustrates multiple network interconnected devices, including a network management device incorporating a network management interface, exemplary of an embodiment of the present invention.

FIG. 1 illustrates, by way of example, digital computer network 10 including computing devices 12, 14 and 16. Devices 12, 14 and 16 may, by way of example, be personal computers; mainframe computers; networking equipment such as routers, switches, frame relays; telephone switching equipment; or the like. Network 10 may for example, be a wide area network, conforming to any of a number of known networking protocols including TCP/IP, IPX, Appletalk, UUCP or the like. Alternatively, network 10 may be a local area network; a collection of interconnected smaller computer networks comprising an intranet or internet; or a portion of the public internet. As will be appreciated and as illustrated, network 10 may be interconnected with other networks such as the public internet, or the public switched telephone network ("PSTN").

Computing devices 12, 14 and 16, are all network management devices that store network management data. Management of any of the network devices may be accomplished by access to device 12, 14 or 16 by one of the other devices 12, 14 or 16, or other interconnected devices (not shown), in communication with network 10.

Figure 2:
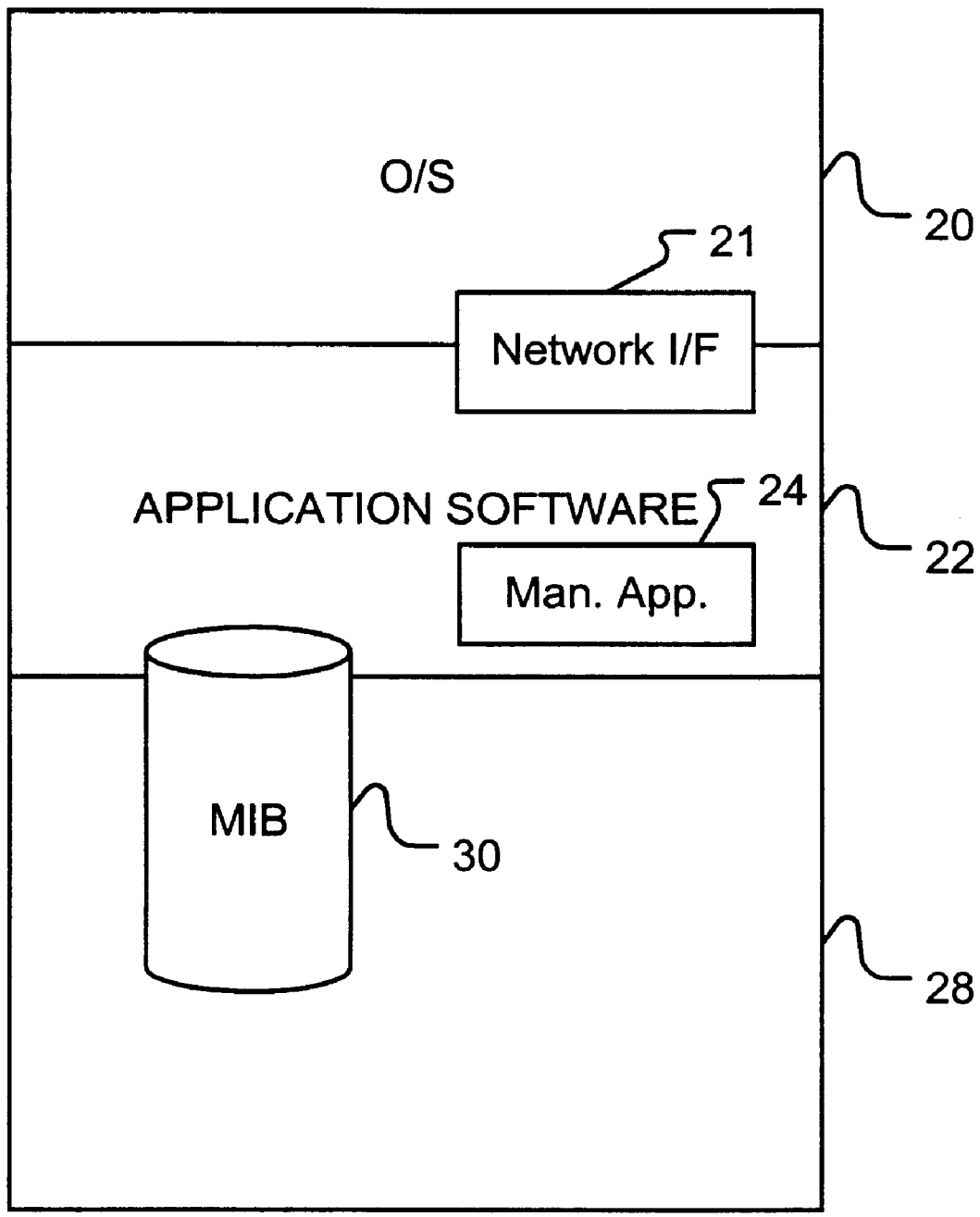
FIG. 2 is a block diagram of the organization of computer memory of the network management device of FIG. 1.

Each computing device 12, 14, and 16 comprises a processor interconnected with storage memory and a network interface. Additionally, each computing device may comprise an input/output peripheral capable of reading data from a computer readable storage medium, such as a floppy diskette, CD-ROM, tape or the like. The organization of memory of computing device 12 is best illustrated in FIG. 2. The organization of memory of computing devices 14, and 16 is similar, but not illustrated. As shown, loaded within persistent memory of each computing device is operational software, including preferably an operating system 20; network interface software 21; and application software 22, preferably including network management application 24. As will be appreciated, the operational software may be loaded from computer readable storage medium 18. Memory of computing device 12 further includes data 28 including an object oriented MIB 30 exemplary of an embodiment of the present invention, formed as a result of loaded operational software.

Operating system 20, may for example be a UNIX operating system. Network interface software 21 typically comprises software allowing communication of device 12 with the remainder of network 10 using a known network protocol. Network interface software 21 may, for example, be an internet protocol suite, and could optionally form part of operating system 20. Application software 22 typically comprises software that in combination with operating system 20, provides other desired functionality of devices 12, 14 and 16, and includes network management application 24 exemplary of the present invention.

Figure 3:
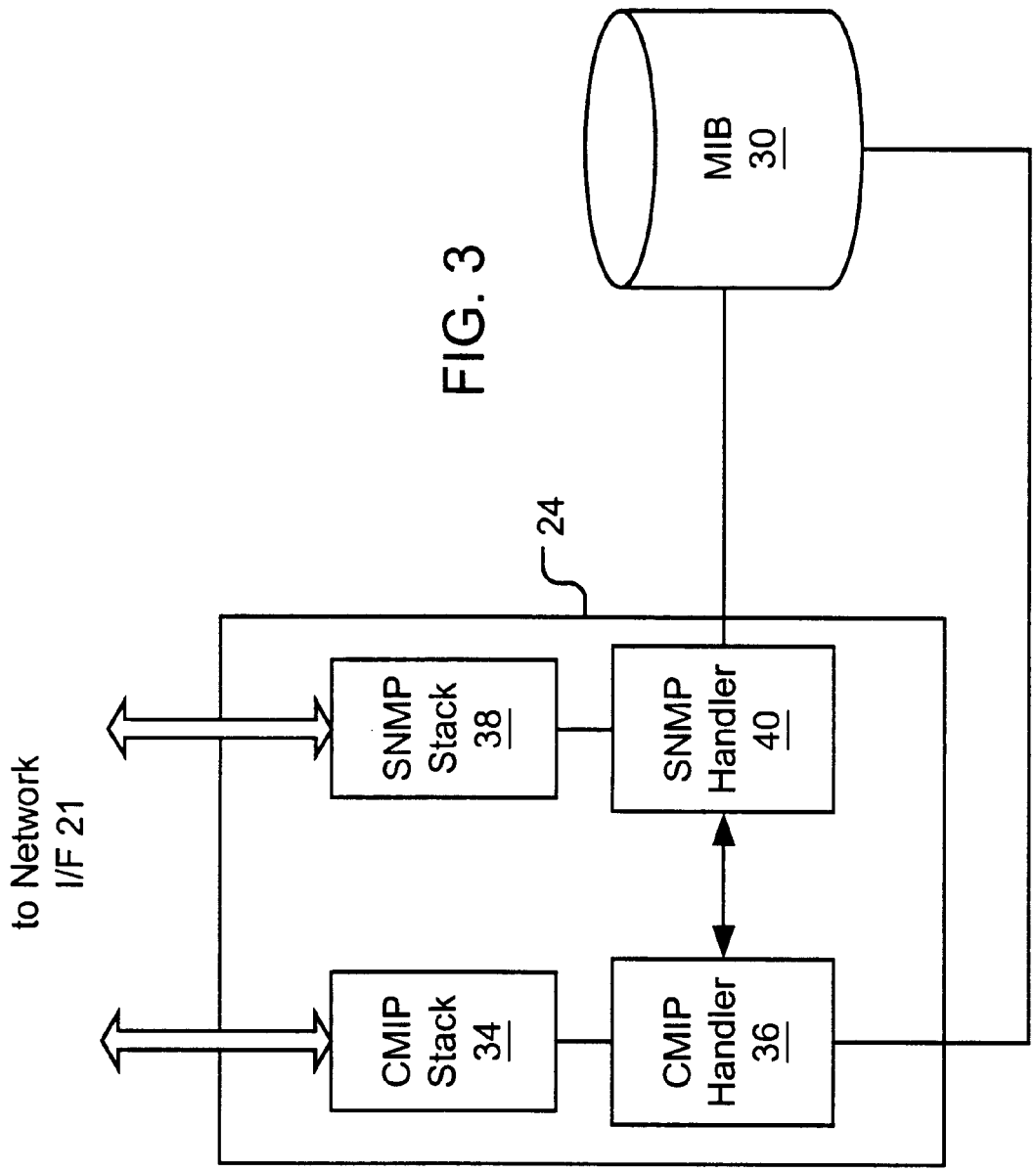
FIG. 3 is a block diagram illustrating organization of applications and data within the network management device of FIG. 1.

FIG. 3 illustrates, in block diagram, the arrangement of network management application 24 and MIB 30 within memory of computer 12. As illustrated, network management application 24 comprises a CMIP stack 34; CMIP handler 36; SNMP stack 38; and a custom SNMP handler 40. Again, devices 14 and 16 have similarly arranged network management applications and MIBs (not illustrated).

CMIP and SNMP stacks 34 and 38 are conventional, commercially available CMIP and SNMP stack applications, as made available by, for example Open and by Networks Engineering (ONE) of Ann Arbor, Mich., 48104 under the Foundation RAD product name and Epilogue Technology Corp. of Sunnyvale, Calif. 94089, under the Envoy product name, respectively. CMIP and SNMP stacks 34 and 38 exchange CMIP and SNMP PDUs with network interface software 21 and CMIP and SNMP handlers 36 and 40. CMIP handler 36 is similarly a conventional CMIP handler as, for example, made available by Vertel of Woodland Hills, Calif., 91637 under the ETS Embedded Telecommunications Solutions for RTOS product name. CMIP handler 36 receives CMIP compliant operations and parameters from CMIP stack 34 and allows access to an object oriented, CMIP suited MIB. Similarly, CMIP handler 36 forms appropriate responses to pass to CMIP stack 38 to be encoded and passed to network interface software 21. SNMP handler 34 is an SNMP handler, exemplary of a preferred embodiment of the invention, and facilitates access to MIB 30 using SNMP operations and parameters decoded by, and received from, SNMP stack 34 as detailed below.

MIB 30 and SNMP handler 40 in memory of device 12 are the result of a compiled executing program or groups of programs, preferably originally formed using a high level object oriented computing language, such as for example, C++, SMALLTALK, Java or another suitable language and compiled.

Figure 4:
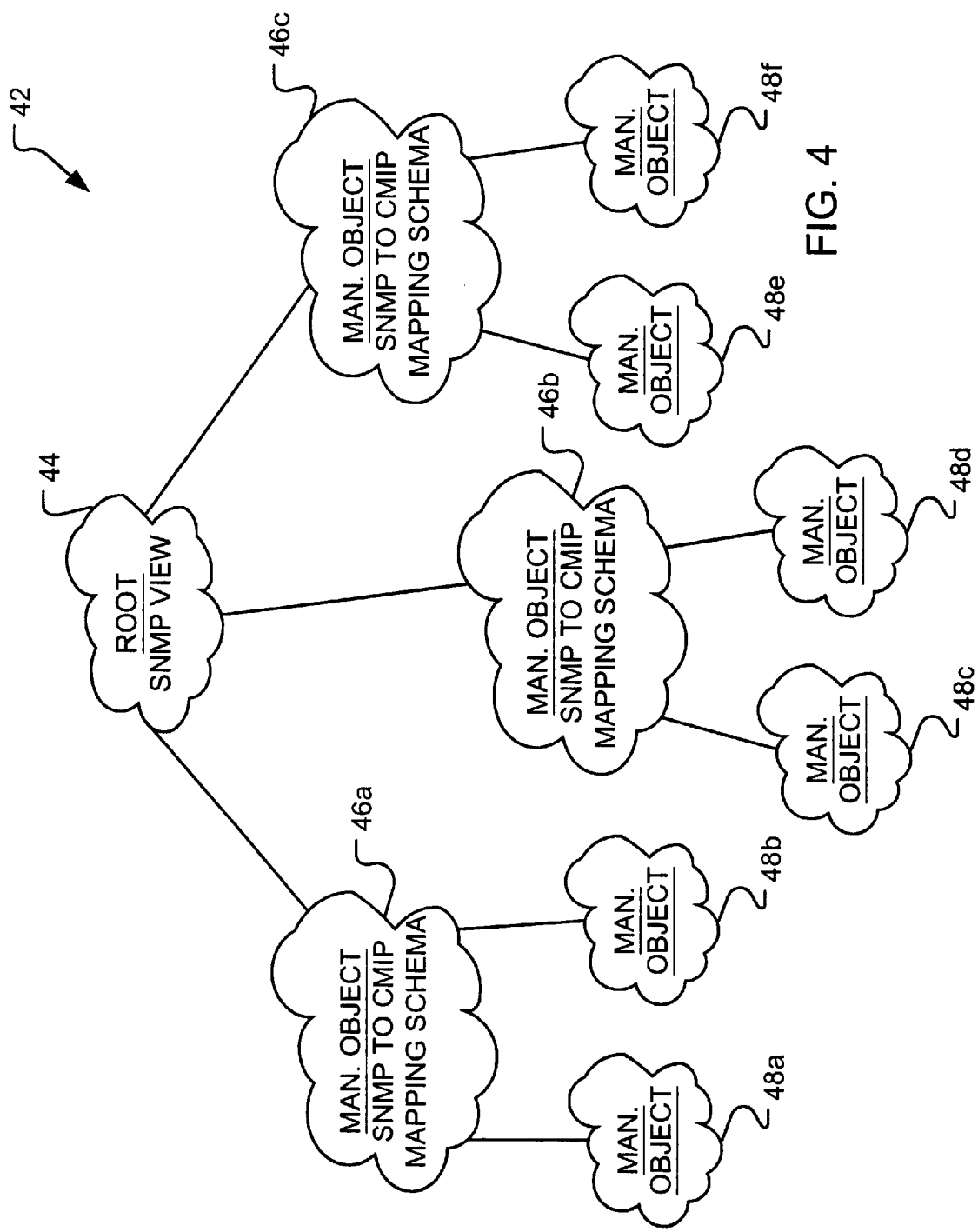
FIGS. 4 and 4A are block diagrams of object oriented structures used to form a management information base exemplary of an embodiment of the present invention.

Specifically, MIB 30 is an object oriented structure, formed as a result of the object oriented classes and subclasses illustrated in FIG. 4. As illustrated, MIB 30 is the result of a hierarchical tree 42 of classes and subclasses 44, 46a, 46b, 46c, 48a, 48b, 48c, 48d, 48e and 48f consistent with CMIP and the management information tree of OSI network management standards. Each node of tree 42 is an object oriented class, that when compiled and executed in memory of device 12 forms instances of objects, each having attributes and functions.

Top node of tree 42 is referred to as the "root" class 44 of tree 42 and is a class that results in objects containing the most general information available about a managed network device 12, referred to as "root" objects. Each subclass 46a–46c, 48a–48f beneath the root class 44 is a subclass of root class 44, that inherits the attributes and functions of root class 44, and further contains additional functions and attributes forming objects having more detailed information about a network area or device, referred to as "managed" objects. The subclasses 48a–48f are further subclasses of classes 46a, 46b, 46c and form objects that contain even more specific information in the MIB that may relate to features or components of the managed device. Each subclass 48a–48f of subclass 46a–46c inherits the functions and attributes of its parent subclass 46a–46c. Subclasses 46a–46c and 48a–48f are object oriented classes referred to as "managed object classes (MOCs)", instances of each class are used to form managed objects, and are often referred to as "managed object instances".

For example, root class 44 may form root objects having attributes and functions used to identify the network 10, its name, its location and the particular devices forming part of network 10. Instances of each subclass 46a, 46b, 46c may detail resources of computing device 12, while instances of subclasses 48a–48f of these subclasses may be associated with the resources such as peripheral, slots, serial devices or parallel devices of computing devices. Multiple resources of the same type are identified by instances of an appropriate subclass, formed during execution of an object oriented program incorporating the class structure.

Each class and subclass 44, 46a–46c, 48a–48f also include the necessary functions to return and modify attributes within the class, in accordance with CMIP. A CMIP stack is thus capable of operating on the resulting objects using standard CMIP operators.

However, exemplary of an aspect of this invention, and unlike in a traditional CMIP compliant object oriented database, root class 44 further defines an SNMP view of tree 42. That is, root class 44 further contains attributes that are indicative of, and correspond to, data contained in a traditional, relational SNMP suited MIB, as supported by management device 12. Additionally, functions to extract and modify these attributes also form part of root class 44.

Specifically, as understood by those skilled in the art, each decoded SNMP PDU typically contains an operation and associated parameters: OidPrefix; snmpINDEX; and last-Match. Additionally, SNMP PDUs are accompanied by a community string that uniquely identifies the network being managed. The OidPrefix parameter identifies a table within a relational SNMP suited MIB; the SnmpINDEX defines an instance within the table; while the lastMatch parameter identifies an attribute within the table. The SNMP operator is one of the get; getNext; set (modify); set (destroy); and SNMP trap operators.

For each type of decoded SNMP PDU, root class 44 defines an attribute dictionary table mapping the OidPrefix of the SNMP PDU to identify a subclass 46a–46b; 48a–48f within tree 42, that may contain information similar to that required by the SNMP PDU. Thus, the SNMP MIB view of root class 44 is actually a dictionary containing a series of supported SNMP MIB information(identified by SNMP OidPrefix) and identifiers of related subclasses 46a–46c; 48a–48, that may contain equivalent information about device 12.

The individual subclasses 46a–46c; 48a–48f, are similarly modified to contain an SNMP to CMIP mapping schema. This mapping schema maps each supported SNMP attribute, as defined by the SNMP lastMatch parameter to a corresponding attribute of a corresponding subclass 46a–46c or 48a–48f. Similarly, each subclass 46a–46f contains functions to access the associated attribute using conventional CMIP instructions. For SNMP attributes not supported by a subclass, no SNMP to CMIP mapping exists.

Figure 4A:
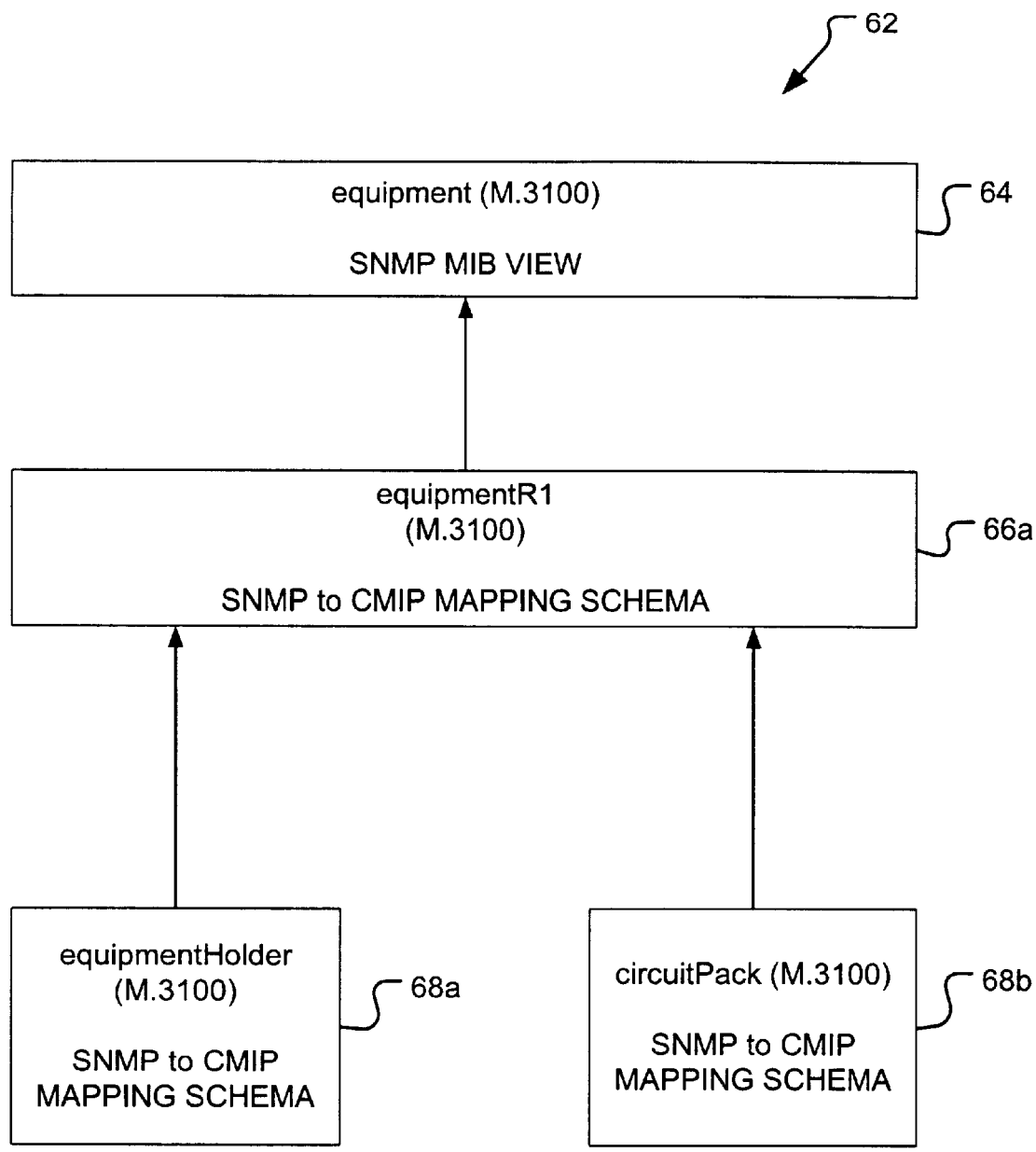

FIG. 4A illustrates a tree structure 62, for an example device, and consistent with the object oriented tree 42 of FIG. 4, and also consistent with the ITU-T Recommendation M.3100, but modified in a fashion exemplary of the present invention. Specifically, root class 64 referred to as "equipment" class of tree 62, consistent with M.3100 contains functions and attributes as defined in M.3100 and further contains functions and attributes providing an equivalent SNMP MIB view of tree 64. The SNMP MIB view returns a values from dictionary of keyed on SNMP OidPrefix parameters for tables that can be accessed from the device. The values are identifiers of the subclasses 66a, 68a and 68b from which tabular or scalar data may be accessed.

The following is example SMALLTALK source code partially defining the SNMP MIB view for the particular device:

^(Dictionary new
- - - -
    add: (#'1.3.6.1.4.1.562.2.5.1.1.1'->ATM10SE); "managedElement"
    add: (#'1.3.6.1.4.1.562.2.5.1.2.1'->Shelf); "shelfEntry"
    add: (#'1.3.6.1.4.1.562.2.5.1.3.1'->CircuitPack); "circuitModuleEntry"
- - -
    yourself).

It worth noting that the SNMP OidPrefix 1.3.6.1.4.1.562.2.5.1.3.1 is mapped to the CircuitPack managed object class in the above exemplary SNMP MIB view.

The exemplary tree 62 further has a number of subclasses 66a, 68a, and 68b to root class 64. These are identified as equipmentR1 class 66a; equipmentHolder class 68a; and circuitpack class 68b, all consistent with M.3100.

Each of the subclasses 66a, 68a and 68b contains a SNMP to CMIP mapping schema that provides a corresponding CMIP attribute of the subclass corresponding to an SNMP lastMatch parameter value. The following is example SMALLTALK source code partially defining the SNMP MIB to CMIP mapping schema for the CircuitPack managed object class:

^(Dictionary new
    at: #'1.3.6.1.4.1.562.2.5.1.3.1' put: "circuitModuleTable" (Array withsize: 10)
    at: 1 put: #snmpINDEX"; circuitPackTableIndex"
    at: 2 put: #defaultUserLabel; "circuitPackLocation"
    at: 3 put: #operationalStateIndex; circuitPackOperationalState"
    at: 4 put: #administrativeStateIndex; "circuitPackAdminState"
    at: 5 put: #equipmentIdentifier; "circuitPackIdentifier"
    at: 6 put: #equipmentVersion; "circuitPackVersion"
    at: 7 put: #circuitModuleTypeINDEX; "circuitPackType"
    at: 8 put: #circuitModuleProtectionModeINDEX; "circuitPackProtectionMode"
    at: 9 put: #myMate SnmpINDEX; "circuit PackMate"
    at: 10 put: #firmware Version; "circuitPackFirmwareVersion" yourself);
yourself).

As will be appreciated, multiple SNMP attributes may be contained, and therefore mapped, in a single subclass.

Lastly, the proper instance of the subclass 46a–46c; or 48a–48f containing the relevant value of the attribute identified by the SNMP lastmatch parameter is identified by the associated snmpINDEX parameter extracted from the SNMP PDU. This snmpINDEX parameter is thus used to access the object that corresponds to the instance of the subclass identified in the root object formed from root class 44 and corresponding to the OidPrefix. The attribute within this instance corresponds to the desired SNMP attribute.

In operation, a CMIP or SNMP PDU is received by computing device 12 (FIG. 1) at its physical network interface from one of device 14 or 16, or from another device interconnected with network 10. The CMIP or SNMP PDU will typically be contained in a network packet, that may be an IP or other network protocol adherent packet. Network interface software 21 (FIG. 3) extracts the PDU and directs the PDU to CMIP stack 34 or SNMP stack 38, based on, for example, the logical port number associated with the packet containing the PDU. If the PDU is an SNMP PDU, network interface software 21 may pass the PDU to CMIP stack 34 or SNMP stack 38. Depending on whether the PDU is a CMIP or SNMP PDU, it may be passed by different layers of network interface software 21 to stacks 34 or 38.

If a CMIP PDU is received, conventional CMIP handler 36 accesses MIB 30 in accordance with the standard CMIP. As noted, classes defining MIB 30 and therefore MIB 30 are CMIP compliant and thus contain all standard CMIP attributes and functions supported by network 10. Instances of objects formed by such classes may be accessed using convention CMIP operations and parameters. Any attribute value is extracted from MIB 30, passed to CMIP stack 34 and encoded to form response CMIP PDUs, that are passed to network interface software 21.

SNMP handler 40, on the other hand, receives decoded SNMP operations and parameters from SNMP stack 34, and translates these to appropriate CMIP compliant operations and parameters that operate on MIB 30 to operate on information as required by the SNMP PDU. As previously noted decoded SNMP PDUs typically contain parameters OidPrefix; snmpINDEX; and lastMatch.

Figure 5A:
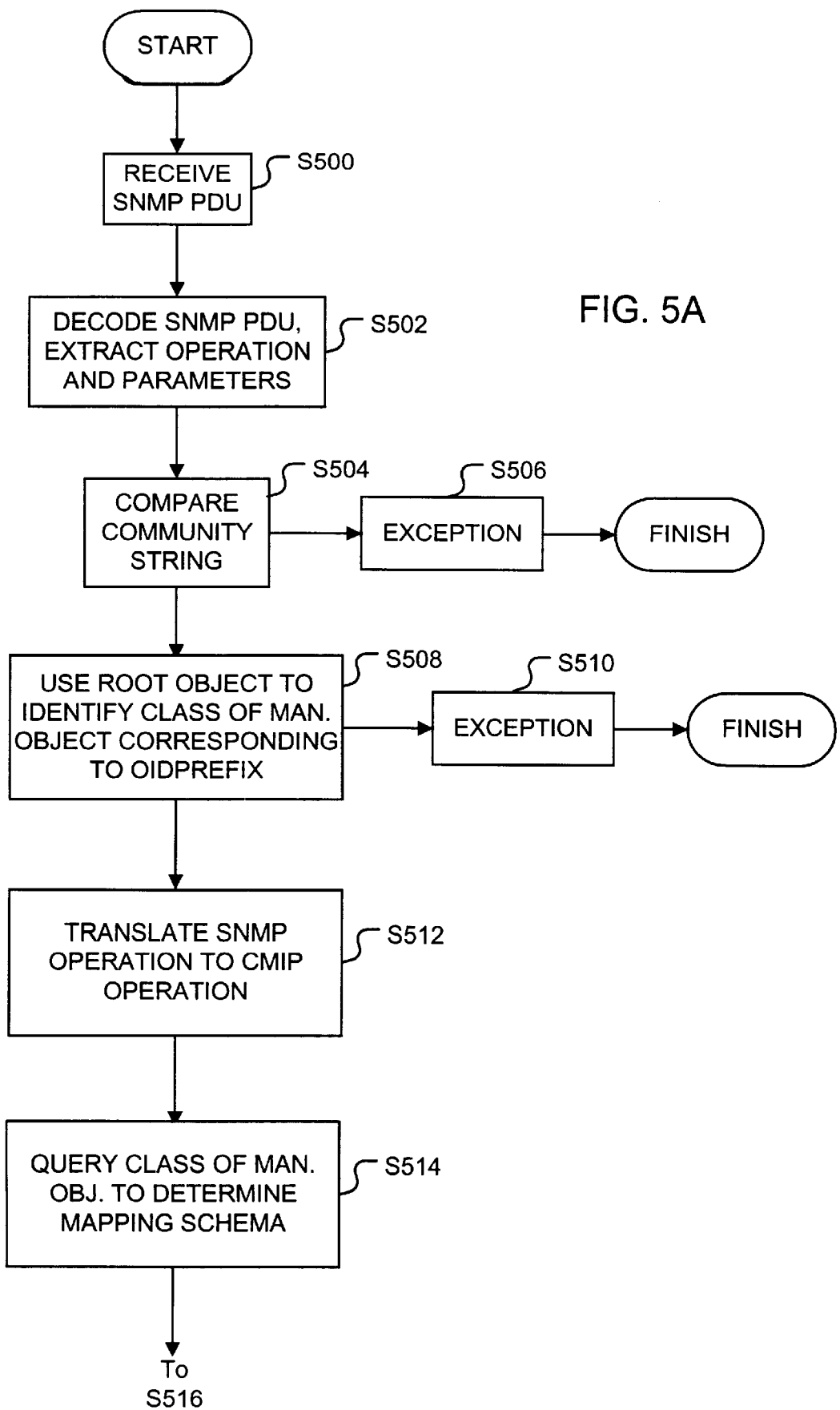
FIGS. 5A and 5B are flow charts of a method exemplary of an embodiment of the present invention.
Figure 5B:
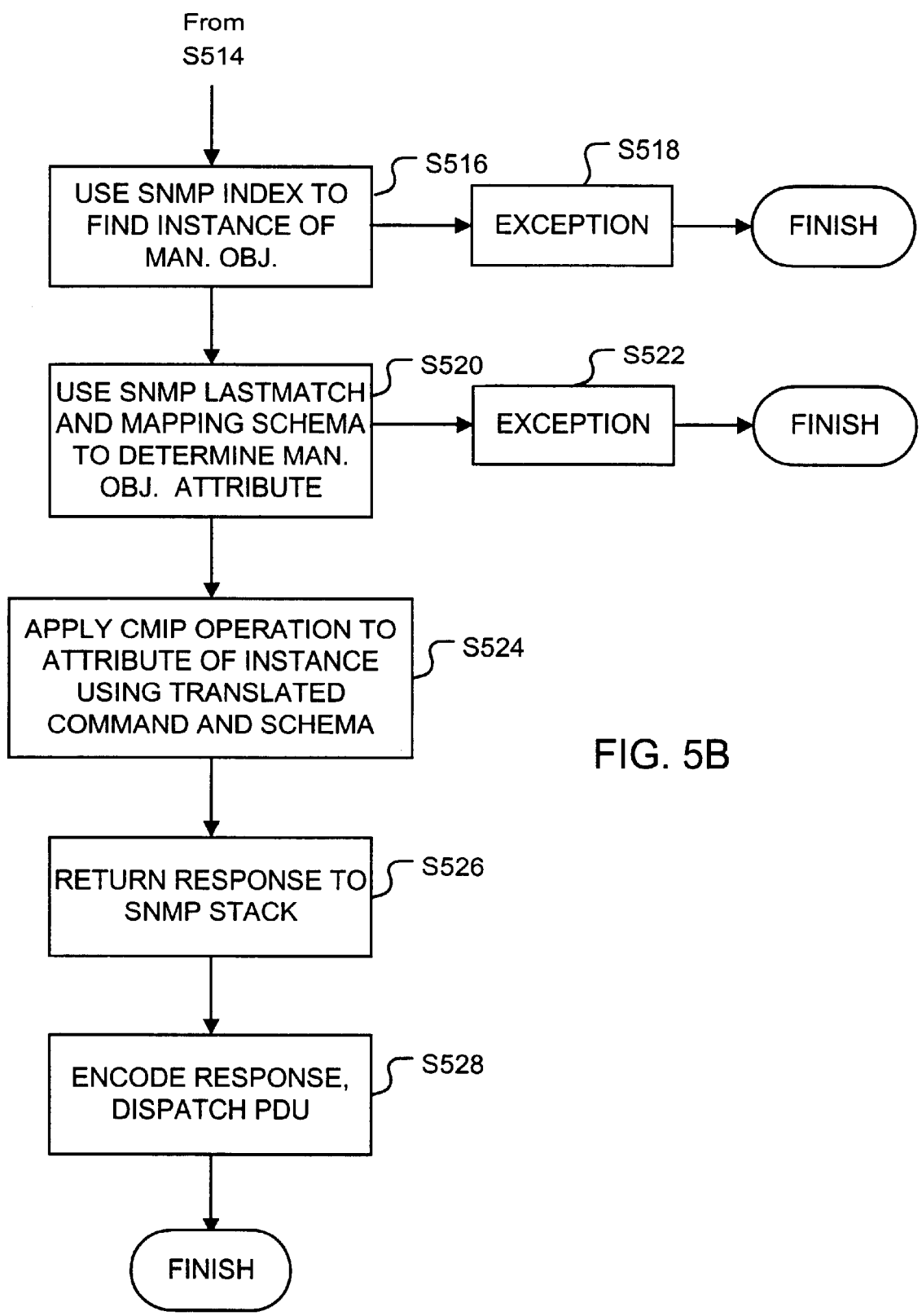

Specifically, as illustrated in FIGS. 5A–5B in step S500, an SNMP PDU is received by network interface software 21 (FIG. 2) of device 12 (FIG. 1). In step S502, the PDU is passed to SNMP stack 38 (FIG. 3) where it is decoded and passed to SNMP handler 40. In step S504, SNMP handler 40 compares the community string associated with the SNMP PDU to an available 30 network identifier and decides whether the SNMP PDU is accepted or discarded. If the community string does not correspond to the community string known to the SNMP handler 40, the received SNMP PDU is discarded and ignored and an exception is generated in step S506.

Once the network has been properly identified, SNMP handler 40 accesses the root object as defined by the root class 44 of tree 42 (FIG. 4) to query the SNMP MIB view of the selected network using the SNMP OidPrefix extracted from the SNMP PDU.

The OidPrefix of the decoded SNMP PDU is used to identify a corresponding subclass 46a–46c or 48a–48f of managed object within tree 42 in step S508. If the root object is unable to return a match for this OidPrefix of the decoded SNMP PDU, exception handling software forming part of SNMP handler 40 will report a "noSuchName" exception in step S510, consistent with the SNMP and indicating that there is no corresponding subclass for the specified OidPrefix, or the particular SNMP operation is not a part of this device's SNMP MIB view. This is passed back to SNMP stack 38, and forms the basis of a response passed to the device originating the SNMP transaction through network interface software 21 (FIG. 2).

If a subclass 46a–46c, 48a–48f of managed object is identified for the OidPrefix, SNMP handler 40 translates the SNMP operation contained in the SNMP PDU to an equivalent CMIP operation using the following translations in step S512:

TABLE 1

| SNMP Operation to CMIP Operation | |
| --- | --- |
| SNMP OPERATION | CMIP OPERATION |
| get | m-Get |
| getNext | m-Get |
| set (create) | m-Create |
| set (modify) | m-Set |
| set (destroy) | m-Delete |
| snmp trap | m-EventReport |

Using the resulting translated CMIP operation in step S514, SNMP handler 40 queries the corresponding subclass, as identified by the root class 44, using the translated CMIP operation and the SNMP lastMatch parameter to determine a mapping schema for the SNMP attribute, within the identified subclass.

In step S516, the SNMP handler 40 uses the snmpINDEX parameter to locate the instance of the corresponding subclass. If the instance of the identified subclass does not exist, the subclass returns an indicator and the exception handler of SNMP handler 40 is again invoked in step S518.

If an instance of the subclass has been located, the value of the SNMP lastMatch parameter and the translated CMIP operator are used in step S520 to locate an attribute within the located instance using the determined SNMP MIB mapping schema as determined in step S514. If SNMP handler 40 is unsuccessful in locating the attribute, the exception handler is invoked in step S522. If the SNMP handler 40 is successful, SNMP handler 40 uses the located subclass instance and performs the translated CMIP operation on the attribute corresponding to the SNMP operation and attribute contained in the SNMP PDU in step S524.

Upon the completion of the CMIP operation, SNMP handler 40 in step S526 forms an SNMP response based on the result. The response is encoded using the SNMP stack 38 in step S528 and returned to the sender of the original SNMP PDU via network interface software 21.

Referring to the example tree 62 of FIG. 4i a, and referring to the specific SMALLTALK source code detailed above, an example Oid in an SNMP PDU of 1.3.6.1.4.1.562.2.5.1.3.1.2.8 may be received by an example device (such as device 12) implementing tree 62. This PDU is decoded by an SNMP stack (such as SNMP stack 38) to yield the following SNMP parameters:

(i) OidPrefix: 1.3.6.1.4.1.562.2.5.1.3.1;
(ii) lastMatch: 2;
(iii) snmpINDEX: 8.

So, in operation, after performing steps S500 to S504 (FIG. 5A), an SNMP handler (such as SNMP handler 40) may use the root object class/equipment class 66 SNMP MIB view to identify the corresponding managed object class for the OidPrefix parameter 1.3.6.1.4.1.562.2.5.1.3.1, in step S508. As a result, SNMP handler 40 identifies the subclass circuitPack 68b using the SNMP MIB view. In steps S512 and S514, SNMP handler 40 converts any SNMP operation accompanying the above parameters to an equivalent CMIP operation and finds the mapping schema accordingly within subclass 68b. In step S516, SNMP handler 40 uses the snmpINDEX parameter of 8 to get locate a corresponding instance of the managed object class 68b (i.e. circuitPack). If a corresponding instance exists, SNMP handler continues with step S520, otherwise, it goes to S518 for exception handling. In step S520, SNMP handler uses lastMatch from the SNMP PDU, (in this example, the value of lastMatch is 2) to determine the managed object attribute, that is defaultUserLabel indicating the location of the circuit pack represented by the object. Upon the successful completion of this step, SNMP handler will perform the remaining steps illustrated in FIG. 5B.

Additionally, device 12 may form and dispatch CMIP event reports, as detailed in ITU Recommendation X.734. As known to those skilled in the art, CMIP event reports are used to notify interested interconnected network devices of the occurrence of a particular event at a managed network device. Such event reports are generated and dispatched as a result of preconfiguration of CMIP handler 36. Typically CMIP event reports are generated by monitoring MIB 30 in a conventional fashion. The generated event report contains an identifier of the class giving rise to the event; the instance against which the report is being generated; and the attribute of the instance of interest.

SNMP handler 40 may additionally be in communication with CMIP handler 36 (as schematically illustrated in FIG. 3), and may dispatch corresponding SNMP traps compliant with RFC 1157, thus notifying interconnected SNMP compliant devices of events giving rise to CMIP event reports. Specifically, SNMP handler 40 receives a CMIP event report, translates the managed object class contained in the event report to an SNMP OidPrefix by accessing root class 44 and performing the reverse mapping performed in step S508 (FIG. 5). Similarly, the corresponding snmpINDEX parameter is obtained from the subclass identified in the CMIP event report, by performing the inverse of steps S516. Lastly, the equivalent lastMatch parameter is determined from the attribute of the subclass by performing the inverse of step S520. The translated SNMP OidPrefix; INDEX and lastMatch parameters are used by SNMP handler 40 to form a SNMP trap equivalent to the CMIP event report. This SNMP trap may be passed to SNMP stack 38 and dispatched to interested (as pre-configured) network management devices using the SNMP. Of course, SNMP handler 40 could generate its own specific SNMP traps. For example, SNMP handler 40 could generate its own traps in response to a reset of network device 12.

In the above described embodiments, each device 12, 14 and 16 comprises its own MIB. However, a person skilled in the art will appreciate that any of devices 12, 14 or 16 could be adapted to act as a proxy for the remaining devices on the network 10. Thus, the adapted proxy device could store the MIB for the entire network; alternatively the MIB for the entire network could be distributed among devices 12, 14 and 16 with a proxy accessing the distributed MIB.

As will be understood, the above described MIB is simplified relating to only a few devices and formed using only a very limited number of subclasses. An actual MIB may be much larger in scale and may be formed as the result of a complex object oriented hierarchy having a very large number of classes and subclasses.

It will be understood that the invention is not limited to the embodiments described herein which are merely illustrative of a preferred embodiment of carrying out the invention, and which are susceptible to modification of form, size, arrangement of parts and details and order of operation. The invention, rather, is intended to encompass all such modifications within its spirit and scope, as defined by the claims.

What is claimed is:

1. An object oriented management information base, for implementation by a computing device in an object oriented framework comprising:
   a. a root object comprising:
      i) attributes identifying a managed object class used to at least partially define said information base and possibly containing information corresponding to information contained in a relational database;
      ii) functions to access said attributes; and
   b. a plurality of managed objects, each said managed object defined by a managed object class, each of said managed objects comprising:
      i) management information attributes;
      ii) a mapping schema, mapping said management information attributes to attributes of said relational database.

2. The object oriented managemen t information base of claim 1, wherein each of said managed objects further comprises:
   functions to access said management information attributes using CMIP operators and parameters.

3. The object oriented management information base of claim 1, wherein said relational database comprises and SNMP compliant management information base.

4. The object oriented management information base of claim 1, wherein said functions of said root object use a single first relational parameter to identify an attribute of said root object identifying one of said managed object classes.

5. The object oriented management information base of claim 4, wherein said first relational parameter is an SNMP OidPrefix parameter.

6. The object oriented management information base of claim 5, wherein each of said managed objects is formed by an instance of one of said managed object classes, and wherein each instance is identified by a second relational parameter.

7. The object oriented management information base of claim 6, wherein said second relational parameter is an snmpINDEX parameter.

8. The object oriented management information base of claim 7, wherein said mapping schema uses a third relational parameter to map said management information attributes to attributes of a relational database, and wherein said third parameter comprises an SNMP lastMatch parameter.

9. A computer readable medium, storing computer software and data that when loaded by a computing device defines an object oriented management information base, as claimed in claim 1.

10. A method of applying an SNMP network management operation to an object oriented management information base, comprising a root object and a plurality of managed objects, said method comprising the steps of:
   a. decoding said SNMP network management operation to obtain first, second and third parameters;
   b. using said first parameter to query said root object of said object oriented management information base to identify a class of corresponding managed object;
   c. using said second parameter to identify an instance of said identified class of managed object;
   d. using said third parameter to identify an attribute of said instance;
   e. translating said SNMP operation to an object oriented operation; and
   f. applying said object oriented operation to said identified instance and attribute of said class.

11. The method of claim 10, wherein said first, second and third parameters comprise SNMP OidPrefix, snmpINDEX and lastmatch parameters, respectively.

12. The method of claim 11, wherein step e. comprises translating said SNMP operation into a corresponding CMIP operation in accordance with the following

| SNMP OPERATION | CMIP OPERATION |
| --- | --- |
| get | m-Get |
| getNext | m-Get |
| set (create) | m-Create |
| set (modify) | m-Set |
| set (destroy) | m-Delete |
| snmp trap | m-EventReport. |

13. The method of claim 12, wherein step f. further comprises using a mapping schema for mapping said SNMP lastMatch parameter to said attribute.

14. The method of claim 13, wherein said mapping schema is part of said managed object class.

15. A network management device, for communication with a digital computer network, said network management device comprising:
   a processor;
   memory in communication with said processor;
   said memory containing
      a. an object oriented management information base comprising:
         I. a root object comprising:
            (i) attributes identifying a managed object class used to at least partially define said information base and possibly containing information corresponding to information contained in a relational database;
            (ii) functions to access said attributes;
         II. a plurality of managed objects, each said of said managed objects comprising:
            (i) management information attributes;
            (ii) a mapping schema, mapping said management information attributes to attributes of said relational database.

16. The network management device of claim 15, wherein said memory further contains
   b. an SNMP stack for receiving SNMP PDUs from said network interface;
   c. an SNMP interface for operating on said object oriented management information base, as required by said SNMP PDUs.

17. The network management device of claim 16, wherein said memory further contains:
   d. a CMIP stack for receiving CMIP PDUs from said network interface;
   e. a CMIP interface for operating on said object oriented management information base as required by said CMIP PDUs.

18. A network management device comprising:
   a. an object oriented management information base storing management information;
   b. means for receiving SNMP PDUs;
   c. means for receiving CMIP PDUs;
   d. means for operating on said object oriented management information in response to said received SNMP PDUs;
   e. means for operating on said object oriented management information in response to said received CMIP PDUs.

19. The network management device of claim 18 wherein said object oriented management information base comprises:
   I. a root object comprising:
      (i) attributes identifying information contained in said information base and corresponding to information identified in a relational database;
      (ii) functions to access said attributes;
   II. a plurality of managed objects, each said managed object comprising:
      (i) management information attributes;
      (ii) a mapping schema, mapping said management information attributes to attributes of said relational database.

20. A computer readable medium storing computer software and data that when loaded by a computing device defines an object oriented management information base, for implementation by said computing device in an object oriented framework comprising:
- a. a root object comprising:
  - (i) attributes identifying a managed object class used to at least partially define said information base and possibly containing information corresponding to information contained in a relational database;
  - (ii) functions to access said attributes; and
- b. a plurality of managed objects, each said managed object defined by a managed object class, each of said managed objects comprising:
  - (i) management information attributes;
  - (ii) a mapping schema, mapping said management information attributes to attributes of said relational database.

21. The computer readable medium storing computer software and data of claim 20, that when loaded by a computing device further defines
- c. an SNMP stack for receiving SNMP PDUs from said network interface;
- d. an SNMP interface for operating on said object oriented management information base, as required by said SNMP PDUs.

* * * * *